United States Patent
Caceres

(10) Patent No.: US 8,522,132 B2
(45) Date of Patent: Aug. 27, 2013

(54) WIDGET BEHAVIOR CUSTOMIZATION VIA CASCADED STYLE SHEETS

(75) Inventor: Barry M Caceres, Las Vegas, NV (US)

(73) Assignee: International Business Machines Corporation, Armonk, NY (US)

(*) Notice: Subject to any disclaimer, the term of this patent is extended or adjusted under 35 U.S.C. 154(b) by 178 days.

(21) Appl. No.: 12/880,992

(22) Filed: Sep. 13, 2010

(65) Prior Publication Data
US 2012/0066585 A1 Mar. 15, 2012

(51) Int. Cl.
*G06F 17/00* (2006.01)

(52) U.S. Cl.
USPC .................................................. 715/234

(58) Field of Classification Search
USPC .................... 715/234, 235, 236, 237
See application file for complete search history.

(56) References Cited

U.S. PATENT DOCUMENTS

| | | | |
|---|---|---|---|
| 7,634,722 B2 | 12/2009 | Barnett | |
| 7,769,773 B1* | 8/2010 | Doubek et al. | 707/769 |
| 8,181,107 B2* | 5/2012 | Melnyk et al. | 715/238 |
| 2002/0107892 A1* | 8/2002 | Chittu et al. | 707/514 |
| 2004/0030758 A1* | 2/2004 | Cherdron et al. | 709/218 |
| 2005/0022116 A1* | 1/2005 | Bowman et al. | 715/513 |
| 2007/0038934 A1 | 2/2007 | Fellman | |
| 2007/0226612 A1* | 9/2007 | Sun | 715/526 |
| 2007/0288858 A1 | 12/2007 | Pereira et al. | |
| 2008/0139191 A1* | 6/2008 | Melnyk et al. | 455/419 |
| 2008/0147671 A1* | 6/2008 | Simon et al. | 707/10 |
| 2008/0148284 A1* | 6/2008 | Epstein | 719/316 |
| 2008/0275903 A1 | 11/2008 | Kent et al. | |
| 2009/0089668 A1 | 4/2009 | Magnani et al. | |
| 2009/0132956 A1* | 5/2009 | Mahasintunan | 715/784 |
| 2009/0158180 A1 | 6/2009 | Manani et al. | |
| 2009/0217160 A1 | 8/2009 | Drukman et al. | |
| 2009/0249282 A1 | 10/2009 | Meijer et al. | |
| 2009/0259950 A1* | 10/2009 | Sullivan et al. | 715/762 |
| 2009/0260022 A1 | 10/2009 | Louch et al. | |
| 2009/0313601 A1 | 12/2009 | Baird et al. | |
| 2010/0037168 A1* | 2/2010 | Thayne et al. | 715/769 |
| 2012/0005429 A1* | 1/2012 | Kalasapur et al. | 711/118 |

FOREIGN PATENT DOCUMENTS

WO 2009130605 10/2009

OTHER PUBLICATIONS

Leung et al. "A CSCW Framework for the Flexible Coupling of Groupware Widgets" Proceedings of the 5th International Conference on Engineering of Complex Computer Systems, (1999), 12 pages.

Yanagida et al. "Flexible Widget Layout with Fuzzy Constraint Satisfaction" 2008 IEEE Conference on Soft Computing in Industrial Applications, (Jun. 2008), pp. 387-392.

* cited by examiner

*Primary Examiner* — Laurie Ries
(74) *Attorney, Agent, or Firm* — Jeffrey T. Holman

(57) ABSTRACT

A computer program product includes a computer readable storage medium to store a computer readable program, wherein the computer readable program, when executed on a computer, causes the computer to perform operations for customizing behavior of a JavaScript widget on a web page via a presentation definition language. The operations include: creating a HyperText Markup Language (HTML) Document Object Model (DOM) element; assigning a CSS class from the presentation definition language to the DOM element; obtaining a computed style for the DOM element, wherein the computed style is computed based on the CSS class assigned to the DOM element; extracting a styling property from the computed style; parsing the styling property to determine an option to be applied to the widget; and applying the option to the widget.

20 Claims, 5 Drawing Sheets

WIDGET BEHAVIOR CUSTOMIZATION VIA CASCADED STYLE SHEETS

BACKGROUND

The content of a web page is generally defined by a markup language. A common markup language used in many web pages is HyperText Markup Language (HTML). The look of a web page may be controlled separately through the use of Cascading Style Sheets (CSS). CSS allows web developers to separate the styling of a web page from the content of the web page by styling individual HTML elements on a page according to a predefined set of properties for each element type, such as applying borders or changing spacing or colors in between elements. In this manner, the style of the web page may be altered without altering the HTML content.

Many CSS properties exist to control the fine-grained (or low-level) behavior of many HTML elements. Additionally, the use of JavaScript with CSS and HTML, collectively known as Dynamic HTML (DHTML), allows for the modification of HTML content without reloading the web page by changing an underlying HTML Document Object Model (DOM) element and applying new content or CSS styling, or swapping JavaScript functions to be activated upon the occurrence of specific user events. A pre-packaged, self-contained unit of DHTML for handling the display of a specific aspect of a web page is often referred to as a "widget."

DHTML toolkits, such as the Dojo Toolkit, provide many such widgets for use in the creation of interactive web applications. It is common practice for widgets to make use of CSS themes that allow for different styling of HTML elements that constitute the display of the widgets. Themeable widgets allow users or page designers to customize the view of a web page. While CSS is designed to modify granular HTML DOM elements created by the widgets, it cannot define custom properties to control the behavior of the widget itself as a single unit. Also, CSS cannot govern the types of DOM elements created nor where they will be created because the structure of each HTML DOM element is outside the control of CSS. Controlling the widgets in such a way under conventional means generally requires that the widgets be modified by a developer, rather than by a page designer.

SUMMARY

Embodiments of a system are described. In one embodiment, the system is a system for customizing behavior of a JavaScript widget on a web page. The system includes: a computer readable storage medium comprising a computer readable storage medium having a code repository to store code for a web page, the code defining an implementation of a widget, and a processor configured to perform operations. The operations include: creating a HyperText Markup Language (HTML) Document Object Model (DOM) element; assigning a CSS class from the presentation definition language to the DOM element; obtaining a computed style for the DOM element, wherein the computed style is computed based on the CSS class assigned to the DOM element; extracting a styling property from the computed style; parsing the styling property to determine an option to be applied to the widget; and applying the option to the widget. Other embodiments of the system are also described. Embodiments of a computer program product and method with the same or similar functionality are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
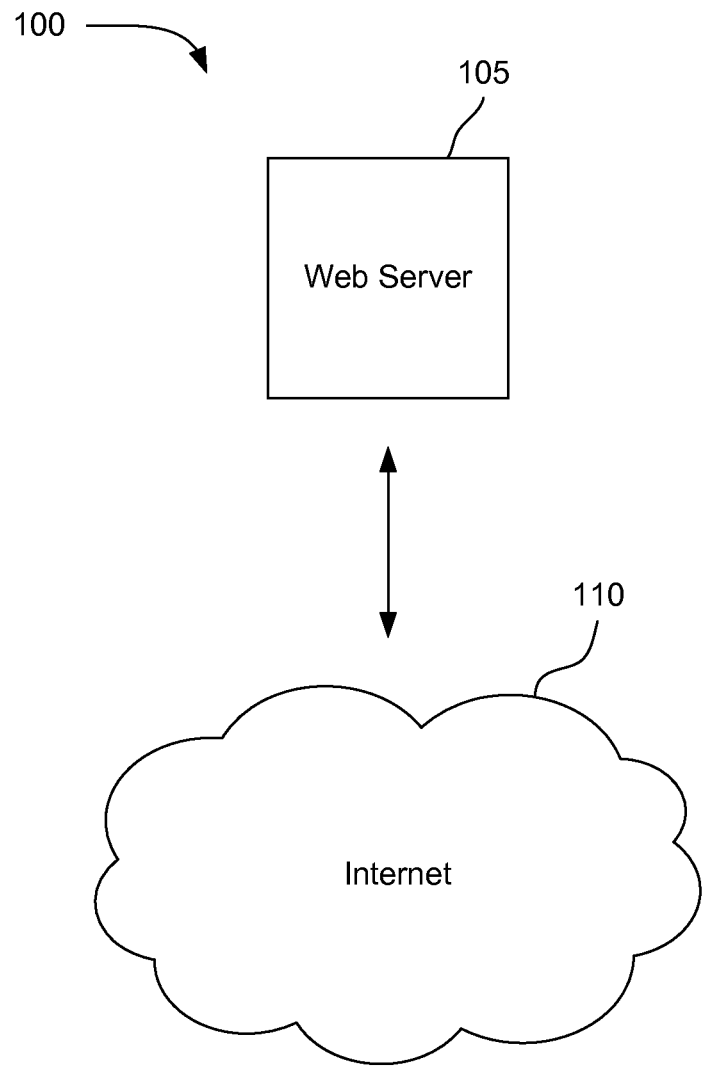
FIG. 1 depicts a schematic diagram of one embodiment of a widget customization system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the embodiments described herein present a method for customizing behavior of a widget on a web page. Embodiments of the method as described herein combine Cascading Style Sheets (CSS), HyperText Markup Language (HTML), and JavaScript to include widgets on a webpage that allow client-side customization of the widgets on a high-level. More specifically, the method uses a framework of JavaScript classes—such as Dojo Toolkit—to extract a styling property to apply a particular option in the styling property to the widget that would otherwise be outside the control of CSS. Conventional methods require such options to be customized at a developer level because CSS by itself is not configured to apply those options to the widgets at a client-side level.

As used herein and in the appended claims, the term "widget" refers generally to a self-contained DHTML component of an interactive web application. Widgets may also be stand-alone applications that are embedded into third party sites. The widgets may be JavaScript widgets that allow dynamic modification of the widget content. Some embodiments of widgets include on-screen tools, such as clocks, sports or stock tickers, newsfeeds, weather applications, and many others.

FIG. 1 depicts a schematic diagram of one embodiment of a widget customization system 100. The illustrated widget customization system 100 is designed to operate in conjunction with a web page (see FIG. 4). The widget customization system 100 may include a web server 105 on which code and other data, including images and text, for the web page are stored.

The web page may be one of several web pages on a web site hosted on the web server 105. The web server 105 may include multiple computer systems configured to communicate with each other. The web server 105 may be connected to the Internet 110 in one embodiment, or in another embodiment to a network of computer systems, so that the web page may then be displayed to other computer systems. The web server 105 may be configured to send data to other computer systems in the network or through the Internet 110, as well as receive data from the other computer systems.

Figure 2:
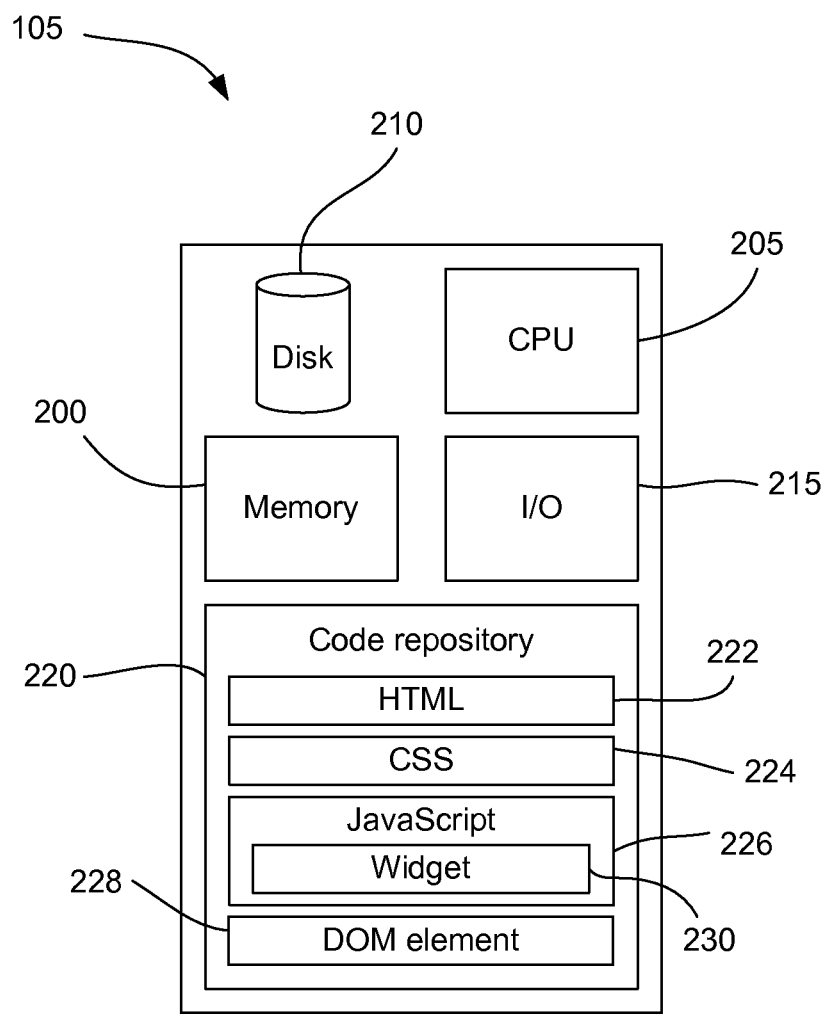
FIG. 2 depicts a schematic diagram of one embodiment of the web server of FIG. 1.

FIG. 2 depicts a schematic diagram of one embodiment of the web server 105 of FIG. 1. The depicted web server 105 includes various components, described in more detail below, that are capable of performing the functions and operations described herein. In one embodiment, at least some of the components of the web server 105 are implemented on a computer system. For example, the functionality of one or more components of the web server 105 may be implemented by computer program instructions stored on a computer memory device 200 and executed by a processing device such as a central processing unit 205. The web server 105 may include other components, such as a disk storage drive 210 or other computer readable storage medium, input/output devices 215, and a code repository 220. The web server 105 may include more than one computer system in communication with each other. Each computer system may be assigned different tasks associated with content for the web page. Additionally, because the web server 105 may be in communication with third party systems via the Internet 110 or a network, the web server 105 may receive data from the third party systems for the web page.

The illustrated web server 105 includes a code repository 220, as previously mentioned. In one embodiment, the code repository 220 includes the ability to use one or more programming languages. The programming languages may be used to control the content and the style of the web page. Programming languages included in the capabilities of the code repository 220 include, but are not limited to: markup languages, which may define the content of the web page; presentation definition languages, which may define the visual layout and stylistic presentation of the content; and other programming languages that allow additional design and content implementations within a web page. Some specific examples of languages that may be included in the code repository 220 include HyperText Markup Language (HTML) 222, Cascading Style Sheets (CSS) 224, and JavaScript 226. Other programming languages in the code repository 220 may include Extensible Markup Language (XML) and Hypertext Preprocessor (PHP), among others.

The use of HTML 222, CSS 224, and JavaScript 226 is collectively referred to as Dynamic HTML (DHTML). DHTML allows the modification of HTML 222 without reloading the page by changing an underlying HTML Document Object Model (DOM) element 228 and applying new content or CSS 224 styling, or by swapping out the JavaScript 226 functions that will be activated upon the occurrence of specific user events. DOM elements 228 are cross-platform conventions for interacting with objects in a markup language such as HTML. DOM elements 228 may be created and manipulated by the particular programming language used.

To further facilitate the ability to streamline the content on web pages and allow interactivity of the content, the code repository 220 may include groups of interrelated web development techniques to create web applications. One such group of web techniques that allows for the retrieval of data from the web server 105 without interfering with the display and behavior of the existing page is Asynchronous JavaScript and XML (Ajax). By driving on-screen updates in such a manner, web pages are moved from a "multi-page" model to a "single-page" model. A multi-page model requests data from the server, receives a response from the server with the requested data, and renders the page to update the page with the new data. A single-page model is able to render the page to show the original content in its original display and follow a process of requesting data from the server, receiving the response from the server, and modifying the page according to the new data received without re-rendering the page. The "single-page" model is sometimes referred to as Web 2.0.

The code repository 220 may include pre-packaged libraries of JavaScript classes or toolkits. One example of a framework of pre-packaged JavaScript libraries is Dojo Toolkit (Dojo). Dojo provides pre-packaged JavaScript classes that act as DHTML themeable widgets 230. Themeable widgets 230 allow the personalization, at least to some extent, of the layout, visual presentation, or displayed content of the widget 230. The widgets 230 create HTML DOM elements 228 on the screen and modify existing elements within the bounds of the page body. Because HTML DOM elements 228 may be styled by CSS 224, the widgets 230 are themeable.

A widget 230 is a piece of code that may be implemented in separate web pages by end users at a client-side level without requiring the end users to compile the widgets 230. Widgets 230 may be developed at a third party computer system, and the code may be transferred to the web server 105 and implemented on the web page. In this manner, the code may be reused in more than one place, either on a single web page, a single web site, or across many web sites and pages.

CSS 224 is designed to modify fine-grained—or low-level—DOM elements 228 created by the widgets 230 according to a pre-defined set of properties for each element type. However, conventional CSS 224 is not capable of modifying coarse-grained, or high-level, behavior of widgets 230, such as defining custom properties that control the behavior of the widget 230 itself as a single unit. Conventional CSS 224 is also unable to govern the type of DOM elements 228 that will be created and where those elements will be created. The structure of the HTML DOM element 228 is outside the direct control of the CSS 224 and, therefore, cannot be controlled directly by a CSS theme.

Figure 3:
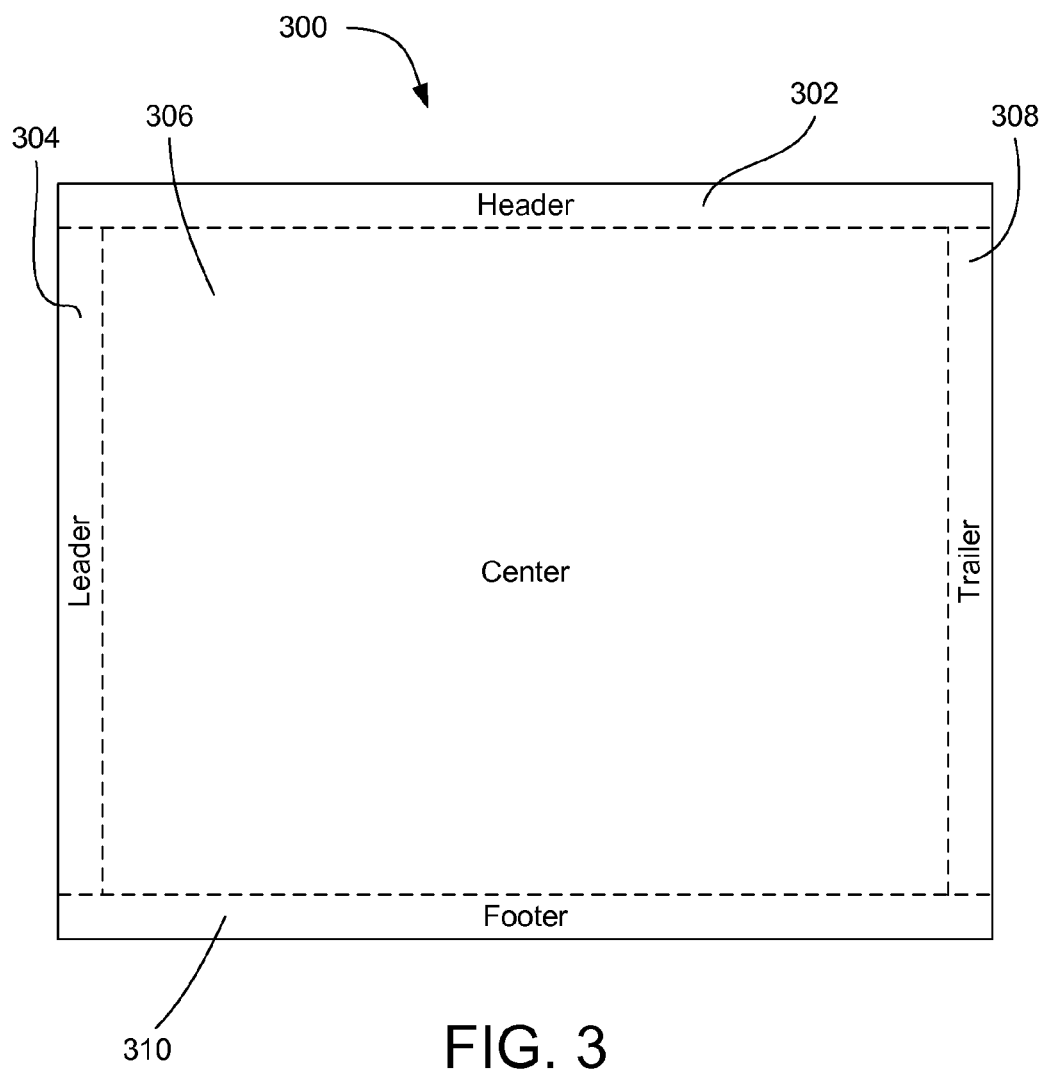
FIG. 3 depicts a schematic diagram of one embodiment of a widget layout.

FIG. 3 depicts a schematic diagram of one embodiment of a widget layout 300. The illustrated widget layout 300 has five internally-defined regions: Header 302, Leader 304, Center 306, Trailer 308, and Footer 310. In some embodiments, all of the regions contain content that is displayed via a visual interface. Other embodiments may have fewer or more regions. In other embodiments, only the content of some of the regions is displayed via the visual interface. CSS 224 is able to control an initial width and height of each region, as well as a background image and the positioning of the image within each region. However, once the widget 230, is implemented in the web page and the page is rendered, the width, height and background image positioning of the regions must be controlled by JavaScript 226, as well. Window resizing and repositioning events after the page has been rendered is accomplished by a JavaScript 226 re-calculation of the widget 230 viewport size, followed by a resizing/repositioning calculation of each of the regions. One example of a widget layout is embodied in Dojo's dijit.layout.BorderLayout widget.

Conventional use of CSS 224 does not provide for custom properties or options to indicate a specific parent HTML DOM element 228 to use for another element. Consequently, conventional CSS 224 is unable to apply an arbitrary CSS property to an element of a widget 230 and have the widget 230 respond to the CSS property by changing its behavior. Because of this, high-level changes to widgets 230 have generally been implemented by an application or widget 230 developer, rather than by a theme designer or through the client-side selection of a theme. Updates to some design aspects of the application can be both cumbersome and time-consuming.

As described herein, CSS 224 may be leveraged to control the coarse-grained behavior of widgets 230. By making use of a temporary or hidden HTML DOM element 228 to which a CSS class is applied, a style of the created DOM element 228 may be computed, and the value of a CSS property may be extracted. In one embodiment, the CSS property is in the form of a Uniform Resource Locator (URL). When the URL is extracted from a value-mapping of CSS properties in the computed style, the URL may be parsed to determine the option(s) to be applied to the widget 230.

In one embodiment, the URL includes options to be applied to the widget 230 in places other than the query-string portion. In another embodiment, the "query-string" portion of the URL may be leveraged to include widget options. The query-string portion may be formatted as name/value pairs. The name/value pairs in the query-string may match up with the values in the computed style. According to one embodiment, the URL may point to a file location where a file is stored that contains one or more options to be applied. This may be particularly useful if the URL is limited by how many name/value pairs may be included in the URL, and the file contains more options than are allowed by a URL formatting standard, whether general or browser-specific. In some embodiments, the file pointer is included in the query-string portion of the URL.

In one embodiment, when the widget 230 is constructed on the web page, a temporary HTML DOM element 228 is created. Alternatively, a hidden HTML DOM element 228 may be used and reused for applying options to subsequent customization of the widget 230 or multiple widgets, rather than creating a temporary HTML DOM element 228. For example, a "div" element—which defines a division or section in an HTML document—may be created. A specific documented CSS class is then applied to the "div" element. The applied CSS class may exist solely for controlling widget-level options. After applying the class, the CSS style of the HTML DOM element 228 is computed (after resolving all cascading styles). The computed style may include a mapping of several CSS properties to their respective values. A CSS styling property whose value is defined in the computed style is then extracted. In one embodiment, the styling property is a URL. In another embodiment, the styling property is formatted in another form.

In an embodiment with a styling property formatted as a URL, the URL may refer to a "background-image" property for a particular region of the widget 230. The "background-image" property defines a background image to be used for a particular widget region. The URL may alternatively refer to a "list-style-image" property, which is used to render a marker or bullet adjacent to an item in an HTML list. A URL may be useful because it is a CSS property type that allows for more flexibility in its value definition than other CSS properties. Some other CSS properties have a more rigid definition structure of possible values or formatting.

After the URL (or other styling property) is extracted, in the embodiment using a temporarily created HTML DOM element 228, the element 228 may then be destroyed. If a permanent, hidden element 228 is used, the CSS class may simply be removed from the element 228 after extracting the styling property. The styling property is then parsed to determine options to apply to the widget 230, and the options are applied to the widget 230. When parsing the URL, for example, the options may be identified in the query-string portion as name/value pairs. Once the options are identified, the remainder of the URL may be discarded. The values for each option name are then applied to the widget 230, accordingly.

Figure 4:
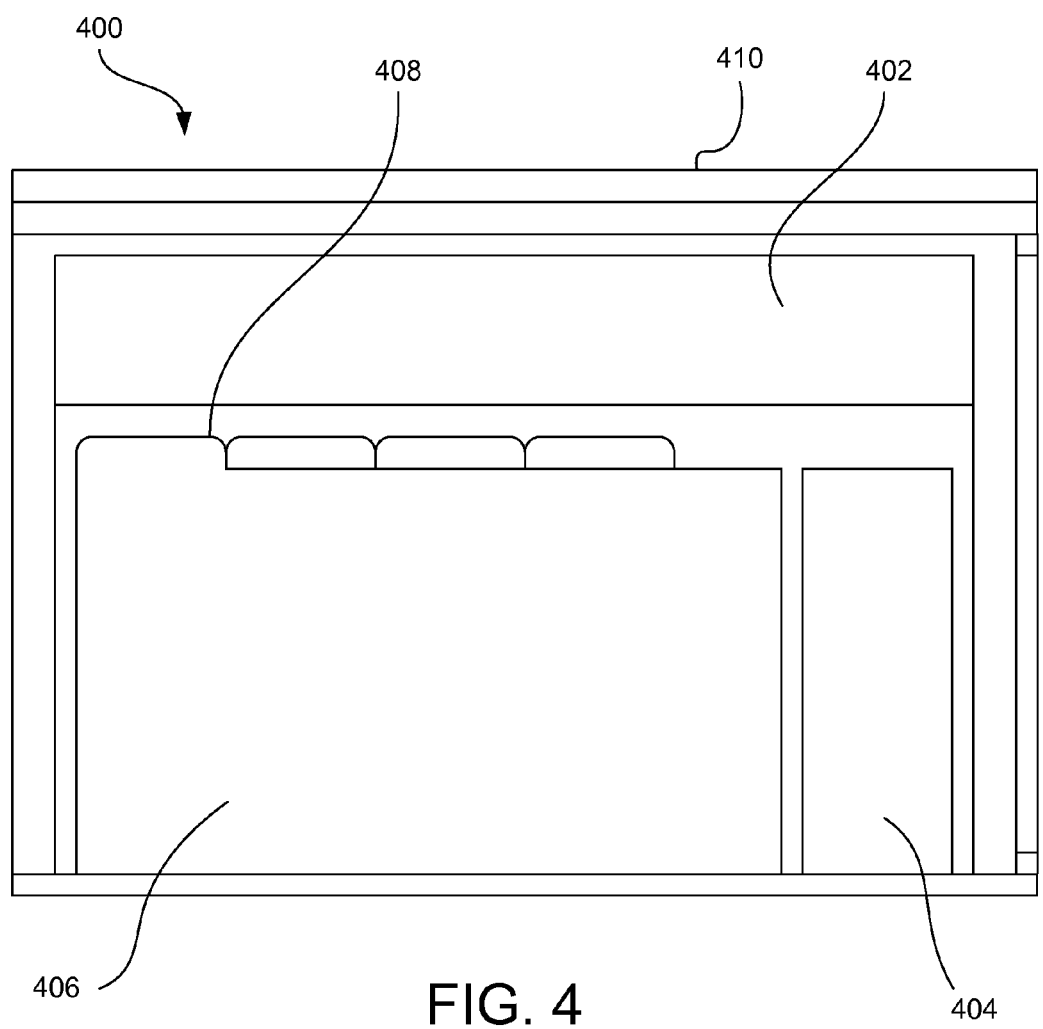
FIG. 4 depicts a schematic diagram of one embodiment of a web page.

FIG. 4 depicts a schematic diagram of one embodiment of a web page 400 within a browser 410. The web page 400 may include several different visual elements, such as a title 402, a side bar 404, a center region 406 for the main content of the web page 400, and/or other layouts or design elements. The center region 406 of the illustrated web page 400 includes several tabs 408 at the top of the center region 406. By designing the illustrated web page 400 using DHTML as described herein, the content in the center region 406 may be updated and/or modified without re-rendering the entire page 400 each time the content changes. Accordingly, the center region 406 may be an interactive widget 230 that allows a user to select the current tab 408 to display. As the user selects different tabs 408, the content displayed in the center region 406 will update to show the content associated with the currently selected tab 408.

While the illustrated widget 230 displays the tabs 408 in the Header 302 of the widget 230, the widget 230 may be configured to display the tabs 408 in the Footer 310, Leader 304, or Trailer 308. Using conventional CSS methods, modifying the placement of the tabs 408 would require changes at a developer level of the widget 230, such that a developer of the widget 230 would have to manually change the coding to reflect the desired change. Using embodiments of the method described herein allows the widget 230 to be modified by the CSS theme, and therefore make the preference selectable at a client-side level, so that a person styling or designing the web page 400 is able to modify the location of the tabs 408 within the widget 230 without manually modifying the internal coding of the widget 230 or by modifying options that are passed to the widget 230 through markup. Other styling options may be applied to the widget 230 or to other widgets on the web page 400 in a similar manner.

Figure 5:
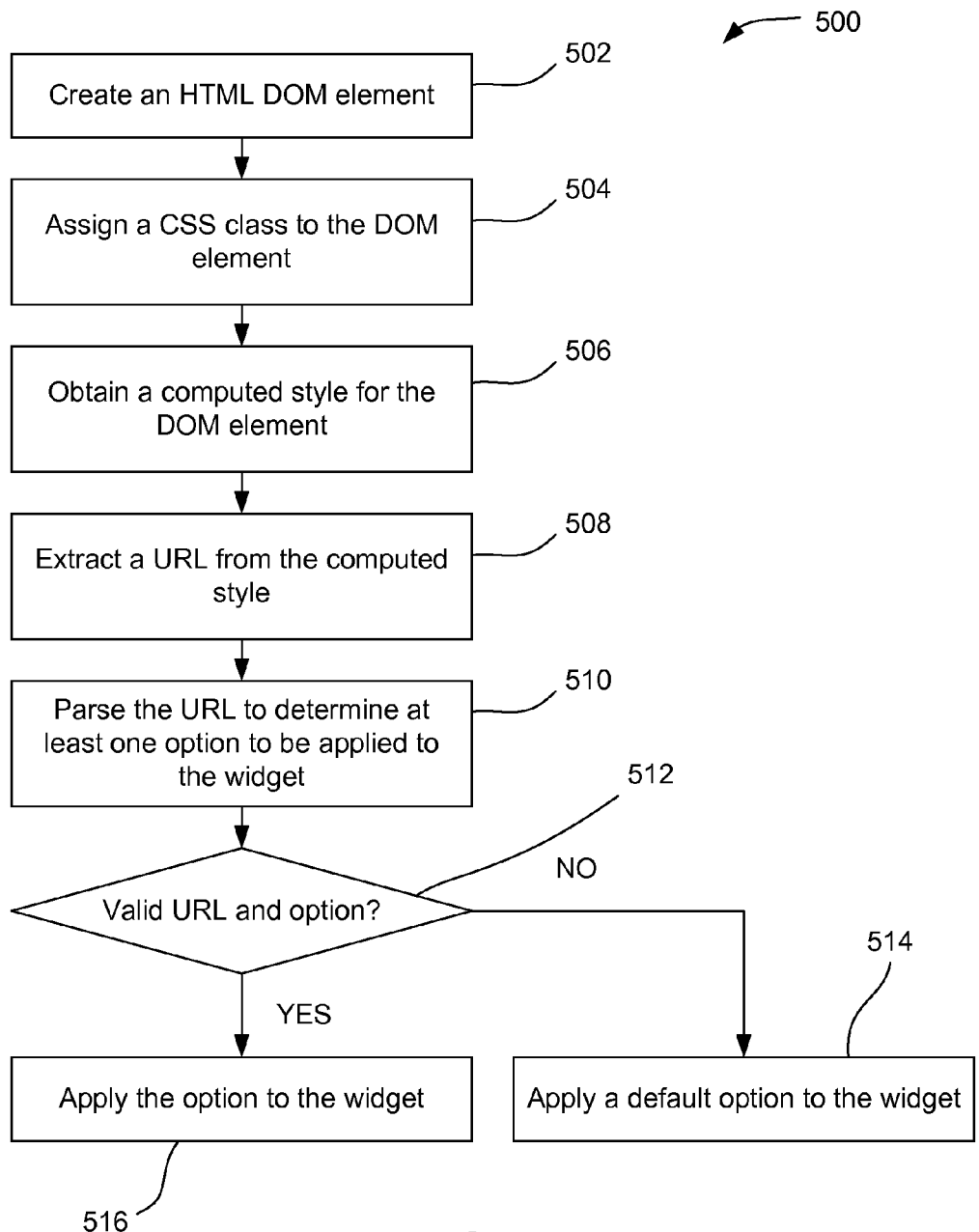
FIG. 5 depicts a flow chart diagram of one embodiment of a method for customizing behavior of a widget on a web page.

FIG. 5 depicts a flow chart diagram of one embodiment of a method 500 for customizing behavior of a widget 230 on a web page 400. Although the method 500 is described in conjunction with the widget customization system 100 of FIG. 1, embodiments of the method 500 may be implemented with other types of widget customization systems.

In one embodiment, the method 500 creates 502 an HTML DOM element 228. The HTML DOM element 228 may be created specifically for applying options to a particular widget 230, in which case the HTML DOM element 228 is temporary and will be destroyed after use. In another embodiment, the HTML DOM element 228 may be a hidden element to be used for applying options to multiple widgets 430, or for applying options to the same widget 230 at different times. In such a case, the HTML DOM element 228 will not be destroyed after use, but is a permanent element and will simply be hidden and may be re-used.

The widget customization system 100 then assigns 504 a CSS class to the HTML DOM element 228. The CSS class may exist solely for controlling widget-level options. The widget customization system 100 then obtains 506 a computed style for the HTML DOM element 228. In one embodiment, the computed style is a mapping of all of the name/value pairs of styling properties for a particular widget. In an embodiment where the computed style is a mapping of all the name/value pairs, all of the CSS properties may need to be determined before obtaining the computed style.

The widget customization system 100 then extracts 508 a styling property from the computed style. In one embodiment, the styling property is associated with a single name/value pair. In one embodiment, the styling property is a URL. For example, the URL may be extracted from a name/value pair associated with the "background-image" property of a particular region of the widget 230. After extracting the styling property, the HTML DOM element 228 may be destroyed if the element is intended to be a temporary element. Alternatively, the CSS class may be removed in order to hide the element 228.

The widget customization system 100 then parses 510 the styling property to determine at least one option to be applied to the widget 230. In one embodiment, the widget customization system 100 parses the URL to find the query-string portion of the URL. The rest of the URL, which may include a reference to a dummy image or blank image file, may be discarded after parsing the URL and determining the options.

After parsing the URL, the widget customization system 100 checks 512 whether the URL is properly formatted. The formatting validity of the URL or other styling property may be determined according to a predefined standard in accordance with the widget 230. The standard may be set by a developer or page designer, or it may be a more general standard. The predefined standard may also be browser specific. If the URL is not properly formatted, the URL is discarded and the system applies 514 or implements the default options to the widget 230 (such as positioning the tabs in the Header 302 of the widget layout 300). Likewise, if the styling options within the URL are not validly formatted, or are not valid options for the specific widget 230, the options are discarded and the widget customization system 100 applies 514 the default options to the widget 230. If the URL and options are validly formatted, and the options are valid options for the specific widget 230, the widget customization system 100 applies 516 the extracted options to the widget 230. If some of the options are valid and others are not, the widget customization system 100 applies 516 the valid options to the widget 230 and applies 514 the default options for the invalid options.

As previously mentioned, the URL may contain a pointer to a file containing multiple options to be applied to a widget 230. If the page designer implements many options to a particular widget 230, the query-string portion of the URL may not be able to hold all of the options, because there may be limits as to how many characters or options may be contained in the query-string portion. In another embodiment, the URL contains pointers to several files having widget options to be applied.

In one embodiment, a widget 230 exposes two regions via the visual interface—a "marquee" region and a "body" region. The user may indicate in which section each piece of content is to be displayed. In one embodiment, the "marquee" region may be located in the Header 302 shown in FIG. 3, and may show a logo or welcome message, for example. The "body" region may contain the content of the widget application in the Center 306. Because the widget 230 is theme-able, different themes may place the "marquee" region in different regions of the widget 230. For example, according to another embodiment, the "marquee" region may be placed in the Footer 310 or other region.

In the above example using "marquee" and "body" regions, and using Dojo, a JavaServer Pages (JSP) markup for such a widget 230 may be:

```
<div dojoType="ibm.AppFrame">
    <div region="marquee" dojoType="ibm.AppMarquee"
    appLogo="..." vendor Logo="...">
        Welcome <%= userName %>
    </div>
    <div region="body" dojoType="dojo.layout.ContentPane"
    href="/main_content.jsp"></div>
    <div>
```

In this embodiment, the "AppFrame" widget contains two child widgets 230. The first is to be displayed in the "marquee" area of the AppFrame, while the second is to be displayed in the "body" of the AppFrame. The "marquee" and "body" are abstract concepts provided by the AppFrame, and a developer does not need to know where they go. The "marquee" and "body" regions may be placed in the desired widget layout 300 regions using the method described herein, according to the CSS theme that has been selected. For example, the options may be applied to the widget 230 by using the following code in a CSS theme:

```
.myTheme .appFrameOptions {
    background-image:
    url("../resources/blank.gif?marquee=header&body=center");
}
```

This sets the "background-image" property to a resource included in a relative path within the CSS theme using "blank.gif" as the background image. The query-string portion of the URL contains "?marquee=header&body=center" and follows "blank.gif" to indicate that the "marquee-region" property should be the Header 302 and the "body-region" property should be the Center 306.

An alternative CSS theme may place the "marquee" in the Footer 310:

```
.myTheme .appFrameOptions {
   background-image:
      url("../resources/blank.gif?marquee=footer&body=center");
}
```

As shown in the above examples, the query-string portion of the URL may be leveraged to allow the application of several widget options for a CSS theme. There may be many other widget-specific behaviors that may be customizable through embodiments of the present method. Additionally, the widget 230 may use the CSS-defined behavior as the default behavior, while still allowing widget-specific attributes to override the CSS-defined behavior as desired.

According to one embodiment, the method may be implemented for a widget 230 using Dojo as shown in detail below:

```
dojo.provide ("ibm.convrg.Util");
dojo.declare("ibm.convrg.Util", null, {
});
ibm.convrg.Util.getCSSOptions = function(/*String*/ className,
                                          /*Node?*/ parentNode) {
   if (! parentNode) {
      parentNode = dojo.body( );
   }
   // create the temporary element
   var optionElem = dojo.create("div", null, parentNode);
   // apply the specified CSS class to the temporary element
   dojo.addClass(optionElem, className);
   // obtain the computed style for the element
   var myStyle = dojo.getComputedStyle(optionElem);
   // extract the background image URL (styling property)
   var bgImage = "" + myStyle.backgroundImage;
   dojo.destroy(optionElem);
   // ensure the background image URL is properly formatted
   if (! bgImage) return null;
   if (bgImage.length < 5) return null;
   if (bgImage.toLowerCase( ).sugbstring(0, 4) != "url(") return null;
   if (bgImage.charAt(bgImage.length - 1) != ")") return null;
   // remove the "url(" prefix and ")" suffix
   bgImage = bgImage.substring(4, bgImage.length - 1);
   // check if URL is quoted
   if (bgImage.charAt(0) == "\"") {
      // if not properly quoted then there is no need to parse it
      if (bgImage.length < 2) return null;
      if (bgImage.charAt(bgImage.length - 1) != "\"") return null;
      // otherwise, remove the quotes
      bgImage = bgImage.substring(1, bgImage.length - 1);
   }
   // find the query string
   var queryIdx = bgImage.lastIndexOf("?");
   var slashIdx = bgImage.lastIndexOf("/");
   if (queryIdx < 0) return null;
   if (queryIdx < slashIdx) return null;
   // get just the query string from the URL
   var cssOpts = bgImage.substring(queryIdx + 1, bgImage.length);
   if (cssOpts == null) return null;
   if (cssOpts.length == 0) return null;
   // parse the query string and return the result
   return dojo.queryToObject(cssOpts);
};
```

Embodiments of the method 500 described herein allow a page designer to implement certain properties in widgets by leveraging CSS 224 that would otherwise have to be implemented manually within the widget code by a developer or through markup where the widget 230 is instantiated. Additionally, conventional CSS 224 does not provide a way to add certain additional properties that will be recognized by all browsers 410. A browser 410 may add its own custom properties that are recognized by that browser 410, but not by other browsers, and no browsers 410 allow for custom properties defined by the web application itself. Embodiments of the method 500 allow the page designer to implement these types of options according to each browser 410 that the web page 400 is designed to run in.

An embodiment of a widget customization system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including some or all of the operations described herein.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. As a specific example, a computer readable medium is a physical piece of hardware capable of storing at least a portion of the program.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
a computer readable storage medium to store a computer readable program, wherein the computer readable program, when executed on a computer, causes the computer to perform operations for customizing behavior of a JavaScript widget on a web page via Cascading Style Sheet (CSS), the operations comprising:
creating a HyperText Markup Language (HTML) Document Object Model (DOM) element;
assigning a CSS class from the presentation definition language to the DOM element;
obtaining a computed style for the DOM element, wherein the computed style is computed based on the CSS class assigned to the DOM element;
extracting a CSS styling property from the computed style;
parsing the CSS styling property to determine a widget-level option contained within the CSS styling property to be applied to the widget; and
applying the widget-level option to the widget.

2. The computer program product of claim 1, wherein the option is stored in a file named in the styling property.

3. The computer program product of claim 1, wherein the styling property comprises a Uniform Resource Locator (URL).

4. The computer program product of claim 3, wherein the option is located in a query-string portion of the URL.

5. The computer program product of claim 3, wherein the URL comprises a pointer to a dummy image,
wherein the computer program product, when executed on the computer, causes the computer to perform additional operations, comprising:
discarding the dummy image after parsing the URL.

6. The computer program product of claim 1, wherein the computer program product, when executed on the computer, causes the computer to perform additional operations, comprising:
destroying the DOM element after extracting the styling property from the computed style.

7. The computer program product of claim 1, wherein the computer program product, when executed on the computer, causes the computer to perform additional operations, comprising:
checking a formatting validity of the styling property and the option, wherein the formatting validity is defined by a predefined standard in accordance with the widget; and
implementing a default option within the widget in response to a determination that either the styling property or the option is invalid.

8. The computer program product of claim 1, wherein the DOM element comprises a hidden DOM element,
wherein the computer program product, when executed on the computer, causes the computer to perform additional operations, comprising:
reusing the hidden DOM element for each subsequent customization of widget behavior on the web page instead of creating a new DOM element.

9. A method for customizing behavior of a JavaScript widget on a web page, the method comprising:
creating a HyperText Markup Language (HTML) Document Object Model (DOM) element;
assigning a Cascading Style Sheet (CSS) class to the DOM element;
obtaining a computed style for the DOM element, wherein the computed style is computed based on the CSS class assigned to the DOM element;
extracting a CSS styling property from the computed style;
parsing the CSS styling property to determine a widget-level option contained within the CSS styling property to be applied to the widget; and
applying the widget-level option to the widget.

10. The method of claim 9, wherein the option is stored in a file named in the styling property.

11. The method of claim 9, wherein the styling property comprises a Uniform Resource Locator (URL).

12. The method of claim 11, wherein the option is located in a query-string portion of the URL.

13. The method of claim 11, wherein the URL comprises a pointer to a dummy image,
wherein the method further comprises:
discarding the dummy image after parsing the URL.

14. The method of claim 9, further comprising:
destroying the DOM element after extracting the styling property from the computed style.

15. The method of claim 9, further comprising:
checking a formatting validity of the styling property and the option, wherein the formatting validity is defined by a predefined standard in accordance with the widget; and
implementing a default option within the widget in response to a determination that either the styling property or the option is invalid.

16. The method of claim 9, wherein the DOM element is a hidden DOM element to be reused each time the widget presentation is customized via CSS.

17. A system for customizing behavior of a JavaScript widget on a web page, the system comprising:
a computer readable storage medium comprising a code repository to store code for a web page, the code defining an implementation of a widget, and
a processor configured to perform operations, the operations comprising:
creating a HyperText Markup Language (HTML) Document Object Model (DOM) element;
assigning a CSS class from the presentation definition language to the DOM element;
obtaining a computed style for the DOM element, wherein the computed style is computed based on the CSS class assigned to the DOM element;
extracting a CSS styling property from the computed style;

parsing the CSS styling property to determine a widget-level option contained within the CSS styling property to be applied to the widget; and applying the widget-level option to the widget.

18. The system of claim 17, wherein the processor is configured to perform additional operations, comprising:

checking a formatting validity of the styling property and the option, wherein the formatting validity is defined by a predefined standard in accordance with the widget; and implementing a default option within the widget in response to a determination that either the styling property or the option is invalid.

19. The system of claim 17, wherein the processor is configured to perform additional operations, comprising:

destroying the DOM element after the styling property is extracted from the computed style.

20. The system of claim 17, wherein the option is stored in a file named in the styling property.

* * * * *